(12) United States Patent
Cimaglio et al.

(10) Patent No.: US 6,476,099 B1
(45) Date of Patent: Nov. 5, 2002

(54) JOINT COMPOUND ADDITIVE FOR REDUCTION OF CRACKING, CRATERING AND SHRINKAGE

(75) Inventors: Scott D. Cimaglio, Gurnee; Frank A. Wawrzos; Charles J. Miller, both of McHenry, all of IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/724,674

(22) Filed: Nov. 28, 2000

(51) Int. Cl.⁷ .............................. C08K 5/41; C08K 5/42
(52) U.S. Cl. .................. 523/218; 524/156; 524/157; 524/158; 524/161; 524/166
(58) Field of Search ..................... 523/218; 524/156, 524/157, 158, 161, 166

(56) References Cited

U.S. PATENT DOCUMENTS

| 3,627,723 A | * 12/1971 | Kealy et al. ............... 529/156 |
| 3,959,206 A | * 5/1976 | Singleton ................... 524/156 |
| 3,961,978 A | 6/1976 | Brodmann ................ 106/288 |
| 4,155,887 A | * 5/1979 | Hetson ...................... 524/27 |
| 4,252,568 A | 2/1981 | Bounini ..................... 106/111 |
| 4,286,995 A | 9/1981 | Smith et al. .............. 106/109 |
| 4,307,009 A | * 12/1981 | Lüders et al. ............ 524/157 |
| 4,312,172 A | 1/1982 | Fisher et al. ............. 130/316 |
| 4,454,267 A | 6/1984 | Williams ................... 524/43 |
| 4,463,039 A | 7/1984 | O'Connell et al. ........ 427/421 |
| 4,483,713 A | * 11/1984 | Motoki ....................... 106/603 |
| 4,504,602 A | 3/1985 | O'Connell et al. .......... 521/78 |
| 4,657,594 A | 4/1987 | Struss ....................... 106/308 |
| 4,661,161 A | 4/1987 | Jakacki et al. ............. 106/112 |
| 4,686,253 A | 8/1987 | Struss et al. ................ 524/44 |
| 4,743,475 A | 5/1988 | Negri et al. ............... 427/387 |
| 4,824,879 A | 4/1989 | Montgomery et al. ...... 524/43 |
| 4,954,545 A | * 9/1990 | Bailey ....................... 524/158 |
| 5,087,653 A | * 2/1992 | Obama et al. ............. 524/158 |
| 5,244,726 A | * 9/1993 | Loney et al. ............... 106/602 |
| 5,336,318 A | 8/1994 | Attard et al. ............... 106/780 |
| 5,494,947 A | 2/1996 | Kaplan ....................... 523/122 |
| 5,653,797 A | 8/1997 | Patel ........................ 106/781 |
| 5,746,822 A | 5/1998 | Espinoza et al. .......... 106/785 |
| 5,779,786 A | 7/1998 | Patel ........................ 106/781 |

FOREIGN PATENT DOCUMENTS

| DE | 1807897 | * 6/1969 | ............... 524/156 |
| DE | 2606273 | * 8/1977 | ............... 524/161 |
| EP | 234529 | * 9/1987 | ............... 524/161 |
| JP | 73942 | * 6/1975 | ............... 524/161 |
| JP | 112251 | * 8/1980 | ............... 524/161 |
| JP | 220253 | * 9/1991 | ............... 524/166 |

* cited by examiner

*Primary Examiner*—Peter Szekely
(74) *Attorney, Agent, or Firm*—John M. Lorenzen; David F. Janci; Greer, Burns & Crain, Ltd.

(57) ABSTRACT

A joint compound composition comprising a filler, a binder and a hydrocarbon substituted sulfate, sulfonate, sulfuric acid or sulfonic acid is disclosed. The composition of the present invention produces a joint compound that shrinks less and is resistant to cracking and cratering.

20 Claims, No Drawings

JOINT COMPOUND ADDITIVE FOR REDUCTION OF CRACKING, CRATERING AND SHRINKAGE

CROSS REFERENCE TO RELATED APPLICATIONS

This application is related to co-pending application U.S. Ser. No. 09/724,736, for a Lightweight Ready-Mix Joint Compound, filed concurrently herewith.

FIELD OF THE INVENTION

This invention relates to a composition for a joint compound for use in filling and coating the joints between adjacent panels of gypsum wallboard. More specifically, it relates to a joint compound composition including a surfactant additive that reduces shrinkage, increases crack resistance and increases crater resistance in a joint compound, without destroying the ability of the joint compound to bond with substrates or decorative applications such as paint.

In the construction of buildings, one of the most common elements is gypsum wallboard, often known as drywall, used in the construction of walls and/or ceilings. Walls made from gypsum wallboard are conventionally constructed by affixing the panels to studs or joists, and then filling and coating the joints between panels with a specially prepared composition called a joint compound. This process generally proceeds by placing a taping grade joint compound within the joint formed by the abutted edges of the wallboards and embedding a liquid-permeable tape within the taping compound. When dry (or set), a second coating comprising a topping grade joint compound is applied over the joint. This is sanded lightly, then a third coat applied and conventionally finished. Another grade of joint compound is an all-purpose grade that is used both for embedding the tape and for applying the finish coats. A patterned effect may be given to the finished wall and joint with the all-purpose joint compound to provide a textured finish.

There are two general types of joint compound, setting type and drying type. Joint compound of the setting type sets up and becomes firm when hydration reactions convert calcium sulfate hemihydrate and water into an interlocking matrix of calcium sulfate dihydrate crystals. Excess water evaporates. Drying type compound becomes firm upon the loss of water by evaporation.

Common problems with joint compounds include cracking, shrinkage and cratering. Cracking and shrinkage occur during the drying process, while craters or surface defects occur during application. Cracking is most likely under harsh environmental conditions or when large amounts of joint compound are applied at once, rather than being applied in several thin layers. Shrinkage and cracking are generally less of a problem with setting type base joint compounds, because some of the water is being absorbed by hydration reactions instead of being driven off by evaporation and because in setting type compounds, the matrix of gypsum crystals formed before drying provides strength to resist shrinkage during drying. Craters are pock marks noticeable on the otherwise smooth surface of the joint compound. It is believed that the factors involved with cratering include rheology, air management and surface tension of the compound.

It is generally known that drywall contractors, in applying joint compounds, sometimes add liquid soap to joint compound immediately before application to improve the finished surface of the joint compound. A soap, or detergent, is a complex mixture of ingredients including, but not limited to acids, bases, antimicrobal agents, antiredeposition agents, colorants, fragrances, defoamers, foamers, hydrotropes, moisturizers, preservatives, solvents, thickeners and surfactants, selected from many possible functional groups. However, soap or detergent addition has also been known to cause a number of problems. Some multicomponent soaps lose effectiveness if they are added at the time of manufacture of the joint compound, making it necessary to measure, add and mix in the soap or detergent immediately before use. It is inconvenient to carry the joint compound, the soap or detergent, a measuring device and a mixer, all to a job site, particularly if it is in a remote location. Use of soaps or detergents also contributes to paint flashing whereby poor paint coverage is obtained.

Two references to O'Connell et al, U.S. Pat. Nos. 4,463,039 and 4,504,602, teach the use of sodium sulfonates as additives to a sprayable acoustical composition to promote foaming. The composition contains mineral wool fillers containing polyolefin fibers. This reference is directed to a sprayable, textured coating and is not useful as a joint compound.

U.S. Pat. No. 4,252,568, to Bounini, discloses the addition of an aqueous solution of ligno sulfonates to make healed stucco for use in gypsum slurries to produce gypsum board. Addition of the ligno sulfate increases the flowability of the stucco and reduces the power required to grind it. There is no claim, teaching or example that such a compound is useful in a joint compound.

It is, therefore, an object of this invention to provide an improved joint compound composition that reduces shrinkage and cracking in drying type joint compounds.

It is another object of this invention to provide an improved joint compound whose additives are all included at the time of manufacture.

It is yet another object of this invention to provide an improved joint compound composition with fewer surface craters.

BRIEF DESCRIPTION OF THE INVENTION

The above-listed objects are met or exceeded by the present invention that features a joint compound composition that exhibits reduced shrinkage and increases resistance to cracking and cratering.

More specifically, the invention relates to a composition that includes a joint compound, which includes a binder and a filler, and a surfactant additive. The surfactant additive consists essentially of a hydrocarbon substituted sulfate, sulfonate, sulfuric acid or sulfonic acid. The hydrocarbon substituent group is an aliphatic, olefinic, alicyclic or aromatic group, or combinations thereof. Further, the substituent group has from 12 to 24 carbon atoms. Preferably, the substituent group includes an aromatic ring. When used in a drying type joint compound, this composition produces a better quality surface compared to traditional joint compounds. The composition of this invention exhibits less cracking and cratering than prior art compositions without several of the drawbacks that are associated with multicomponent soap or detergent addition.

The joint compound of the present invention also shrinks less than conventional joint compounds. When there is less shrinkage, there are several benefits. Fewer layers of joint compound need be applied to obtain a smooth, monolithic surface. Less joint compound will be required to complete the job. Time will be saved by less waiting for the layers to be applied and less waiting for the compound to dry between coats.

Addition of the hydrocarbon substituted sulfonates sulfates, sulfuric acids or sulfonic acids of the present invention is completed during the manufacture of the joint compound. This eliminates the need to separately carry the additive and a measuring device to a remote job site. Use of the instant additive also minimizes paint flashing.

Another benefit of this composition is a decrease in density when used in a lightweight joint compound. All other properties being equal, lightweight joint compounds are preferred over heavier products. Contractors who apply these compounds in large quantity become fatigued less quickly when handling light products. Low density products are also less expensive to ship than their traditional counterparts. The composition of the present invention also produces a reduction in density in lightweight joint compounds, making it easier to apply and less costly to ship.

DETAILED DESCRIPTION OF THE INVENTION

The composition of the present invention is a blend of a joint compound with a surfactant additive. The surfactant additive includes a hydrocarbon substituted sulfate, sulfonate, sulfuric acid or sulfonic acid. When the sulfate or sulfonate salt is used, potassium or sodium is the preferred cationic component. In the preferred embodiment, the surfactant is blended with a ready-mix, drying-type joint compound. The surfactant additive preferably is added to a joint compound when it is manufactured.

The first component of the present invention is the surfactant additive, which is a hydrocarbon substituted sulfate, sulfonate, sulfuric acid or sulfonic acid. The surface of the joint compound made with one of these compounds has fewer flaws, such as cracks or craters. Although sulfonates are preferred, sulfates sulfuric acids, and sulfonic acids are also useful.

The surfactant additive is variable as to what cationic portion is used. The acids, sodium or potassium salts of the hydrocarbon substituted sulfates or sulfonates are the preferred compounds. Cationic portions that do not readily disassociate, such as isopropyl amines, are generally not effective in this invention. Choice of a cationic portion will, of course, result in a change in the molecular weight of the sulfonate salt. Use of a different cationic portion, other than sodium, will lead to over or under-representation of the anionic portion in calculation of the weight % of surfactant additive present. Therefore, for purposes of description herein, the quantity of surfactant additive is calculated on the basis of the sodium salt, and should be recalculated if other than sodium is employed so that the concentration of the anionic portion is the same.

The overall chain length of the hydrocarbon substituent group is variable from about $C_{12}$ to about $C_{24}$. A preferred carbon number range is from $C_{12}$ to $C_{18}$. Another preferred range is from $C_{16}$ to $C_{20}$. A more preferred range is from about $C_{16}$ to about $C_{18}$. The most preferred hydrocarbon substituent contains 18 carbon atoms. Preferably, the substituent group includes an aromatic ring. Sodium dodecyl benzene sulfonate ("DDBSA") is the most preferred surfactant additive for several reasons. The eighteen-carbon chain length efficiently produces the desired results, and is also available at a reasonable cost, and in commercial quantities. Substituent groups of longer chain length, in the range of $C_{19}$–$C_{24}$, are also contemplated for use in this invention. The surfactant additive should be added in a concentration (calculated in regard to the sodium salts) from about 0.03 to about 0.5% weight % based on the dry weight of the total inventive composition, and preferably from about 0.1 to about 0.2%.

The second component of the present invention is a base joint compound. The term "base joint compound" is used to refer to any joint compound before the surfactant additive of the present invention is added. Either setting or drying type joint compounds are suitable, although the results will be more evident in a base joint compound of the drying type. Both dry powder formulas, where water is added at the time of use, or ready-mix formulations, with the water mixed in at the time of manufacture, are suitable for use with this invention. It is also contemplated that the present invention will be used with lightweight formulations as well as traditional base joint compounds. The preferred base joint compound is a conventional weight, ready-mix compound of the drying type.

The base joint compound generally includes one or more binders, one or more fillers and other additives as required by the particular application to be used. Any conventional binder that is used in joint compounds may be utilized in this invention. Binders that are particularly suitable include polyvinyl acetates, acrylics, polyvinyl alcohols, redispersible powders, such as polyvinyl acetate, ethylene vinyl acetates, and starches. Latex binders are the preferred binders. Examples of suitable latex emulsion binders include ethylene vinyl acetate copolymer latex or polyvinyl acetate latex. Combinations of binders are also contemplated.

Certain fillers will be present depending on the type of joint compound to be prepared. Setting type joint compounds are generally based on calcium sulfate hemihydrate, also known as calcined gypsum or Plaster of Paris. Drying type joint compounds generally include either calcium carbonate or calcium sulfate dihydrate, also known as gypsum or landplaster, as fillers. The preferred filler is finely ground calcium carbonate. It is a dry powder that usually comprises at least about 50% by dry weight of the joint compound composition and generally falls within the range of about 50-95% of the dry weight. The ratio of the fillers to the binders are preferably in the range of about 100:1 to about 10:1.

Other fillers, such as perlite, expanded perlite, magnesium carbonate, glass or resin microbeads are also suitable fillers, depending on the type of joint compound desired. Dolomite, a mixture of calcium carbonate and magnesium carbonate, is also a preferred filler. Perlite or expanded perlite is preferred when a lightweight filler is desired. Often, several different fillers are used in combination to obtain a specific set of properties. Use of expanded perlite in a lightweight joint compound is taught in U.S. Pat. No. 4,454,267, which is herein incorporated by reference. Expanded perlite is a very lightweight material that contains many cracks and fissures. It is preferably treated according to the teachings of U.S. Pat. No. 4,525,388, which is hereby incorporated by reference, so that the material does not increase in weight due to water absorbed by capillary action. The treated, expanded perlite is preferably present in amounts of from about 8% to about 18% based on the dry weight. Lightweight fillers, as used in joint compounds, are taught in co-pending application U.S. Ser. No. 09/724,736, filed concurrently herewith, for a Lightweight Joint Compound, which is herein incorporated by reference. A combination of resin microbeads and expanded perlite is the preferred filler for lightweight joint compounds.

Thickeners are optionally added to the joint compound to achieve a desired consistency. Cellulosic compounds, associative thickeners or starches are the preferred thickeners, with cellulosic thickeners being most preferred. Conventional cellulosic thickeners, such as ethylhydroxy ethylcellulose, hydroxypropyl methylcellulose, methylhydoxypropyl cellulose and hydroxyethyl cellulose, are also suitable in the joint compounds of this invention. The amount of cellulosic thickener ranges from about 0.05% to about 2% of the weight of the total joint compound ingredients, excluding water.

Preservatives are optionally added to ready-mix formulations to prevent bacteria and fungi from attacking the organic components over a period of time. Both a bactericide and a fungicide are recommended. TROYSAN® 174 by Troy Chemical Company is the bactericide of choice, while the preferred fungicide is FUNGITROL® 158, made by Huls America, Inc. These ingredients are used in minor amounts, generally ranging from about 0.05 to about 1% of the total dry weight.

Finally, suspending agents are preferably included to keep the heavier components of the composition from settling out. Clays, such as bentonite, kaolin, sepeolite or attapulgite clay are particularly preferred suspending agents, with attapulgite clay being the most preferred. Suspending agents are generally present in amounts from about 0.5% to about 5% of the dry weight.

Water is added to the joint compound at the time of manufacture or just before use to achieve the correct viscosity. Generally, water is added to the joint compound until the desired viscosity is obtained, depending on the specific application for which it is used. Preferably, water is added until the Brabender viscosity reaches 350–850. A Brabender viscosity of 350–550 is most preferred when the viscosity is measured at the mixer. For ready-mix joint compound, viscosity of the final product as packaged will vary greatly depending on final product processing. Down-stream handling of the product often results in an increase in viscosity. The target viscosity of the packaged ready-mix product is preferably from about 400–700 Brabender units.

A number of optional ingredients are also suitable to optimize the formulation for a particular application. Pigments are added to control the color of the finished joint compound. Mica or talc optionally are also added to the joint compound to modify the rheology of the slurry.

Any known joint compound components may be added except additional surfactants. The surfactant additive of the present invention is most effective when there are no additional surfactants present in major amounts. Other surfactants may be present as long as the nature and/or concentration do not seriously disadvantageously affect performance. The surfactant additive of the present invention preferably comprises at least 90% by weight of all surfactants present in the joint compound.

Manufacture of the ready mixed joint compound includes combining of wet with dry components in a mixer. Some ingredients, including the preferred surfactant additive, sodium dodecylbenzene sulfonate, are available in either dry or liquid form. The preferred binder, a latex binder, is a liquid, but other binders are available as powders. All components are grouped as to their physical form. The wet components are generally blended directly in the mixer. Water is placed in the mixer and first blended with the other wet components, such as the surfactant additive and the binder, if they are in liquid form. The dry components generally include the fillers, suspending agents and thickeners. It provided as a powder, the binder and surfactant additive are also mixed with the dry components. These components are blended together before addition to the mixer using any technique known in the art to blend dry ingredients together. Powder feeders are optionally used to disperse the suspending agents or thickeners in with the fillers as they are moved to the mixer by conveyor.

After the wet ingredients have been combined, the dry components are mixed in with the wet components in the mixer. Mixing continues until a homogeneous mixture is obtained. Additional water is added, if necessary, to achieve a desired viscosity. This viscosity will vary depending on exactly what type of joint compound is being prepared, but the target viscosity is generally between 350–850 Brabender units.

The following examples demonstrate the scope of the present invention. All percentage amounts of materials were calculated on a dry weight basis.

EXAMPLE 1

Comparative Example

A generic joint compound was evaluated as a control to determine the amount of cracking, cratering and shrinkage when no surfactant additive was added. The composition of 6715A is shown in Table I.

TABLE I

| Material | Amount | Name | Supplier |
|---|---|---|---|
| Expanded Perlite | 2.25% | Noble 200 C | Noble Materials Inc. |
| Attapulgite Clay | 3.75% | Gel B | Milwhite Co., Inc. Houston, TX |
| Methyl Hydroxy Propyl Cellulose | 0.50% | METHOCEL ® 240S | Dow Chemical Co. Midland, MI |
| Hydroxy Ethyl Cellulose | 0.15% | NATROSOL ® 250 HWR | Hercules-Aqualon Palatine, IL |
| Yellow Iron Oxide | 0.01% | MAPICO ® Yellow | Specialty Minerals New York, NY |
| Limestone | 91.37% | MARBLEWHITE ® 310 | Specialty Minerals New York, NY |
| Latex Vinyl Acetate Polymer | 1.86% | FULATEX ® PD-0722 | H. B. Fuller Co. Arden Hills, MN |
| Bactericide | 0.05% | TROYSAN ® 174 | Troy Chemical Corp. Newark, NJ |
| Fungicide | 0.05% | FUNGITROL ® 158 | Huls America Inc. Des Plaines, IL |

The dry materials, the first six ingredients, were mixed together, totaling 3925 pounds of dry materials. The wet materials, including 124.2 pounds of the vinyl acetate polymer, 2.0 pounds each of the biocides and water, were blended in the main mixer. When the wet materials were blended to a uniform consistency, the dry materials were added to the main mixer, and blended to form a soft dough. Additional water was added to obtain the desired viscosity. A total of 1850 pounds of water was used.

Performance characteristics of the control joint compound are shown in Table II. Shrinkage and cracking were evaluated using the ASTM 474–97 procedure. Cracking was determined by a modified version of the ASTM 474–97 test. A visual inspection of the surface of the joint compound was performed. Cracking was evaluated by rating small cracks, known as check cracks, and larger cracks, or fissures. A panel with zero cracks was reported as having no cracking. Minor cracking related to panels with 1–4 check cracks, moderate cracking had 4–8 check cracks and major cracking represented a panel with more than 8 cracks. A fissure was counted as two check cracks for purposes of this rating.

TABLE II

| Example | Surfactant | Shrinkage | Cracking | Cratering Count | Avg. Area Per Crater |
|---|---|---|---|---|---|
| 1 | None | 17.5% | Moderate | 206 | 0.26 |

Cratering was quantified by a computerized scan of test samples. The joint compound was thinned to a viscosity of 200 Brabender units and poured into a 10" square box at setting zero. Setting zero corresponds to a template setting designed to ensure that a mean film thickness of 6.05 inches of gypsum is produced. Thickness of any one particular position within the box will vary due to the presence of craters, flowability and other factors. When set, the test piece was removed from the box, and a 6"×6" sample was cut from the center of the piece. The sample was placed on a computer scanner and scanned to obtain a digitized image. Verity IA, LLC software was used to count the craters in each digitized image, and calculate the average area (mm²) for each crater in the sample. The control sample had a large number of small craters.

EXAMPLES 2–10

Several surfactants were tested to determine if they enhanced joint compound performance in the areas of cracking, shrinkage and surface defects. The same generic joint compound formula (6751A) tested in Example 1 was used in Examples 2–10, as well as the same test procedures. The surfactants listed in Table III were evaluated.

TABLE III

| Material | Supplier | Description | Substituent Hydrocarbon Chain Length |
|---|---|---|---|
| WITCONATE 90-FLAKE | Witco | Sodium dodecylbenzene sulfonate | 18 |
| Reagent grade 4-Octylbenzene Sulfonate | Aldrich | Branched alkylbenzene Sulfonate | 14 |
| Reagent grade Xylene Sulfonate | Aldrich | Sodiumxylene sulfonate | 8 |
| BIO-SOFT ® N-411 | Stepan | Isopropyl amine salt of dodecylbenzene sulfonate | 18 |
| BIO-TERGE ® AS-40 | Stepan | Sodium Olefin Sulfonate | 14–16 |
| CEDEPHOS ® FA-600 | Stepan | Complex phosphate ester | Proprietary |
| POLYSTEP ® A-16 | Stepan | Branched sodium alkylbenzene sulfonate | 18 |
| STEPANOL ® ME-DRY | Stepan | Sodium Lauryl Sulfate | 12 |
| NO POCK! ® | No Pock | Multicomponent Soap | Various |

The surfactants were added in amounts of 0.2% by weight, based on the dry weight of the joint compound. The amounts were adjusted for the purity of the surfactant as reported by the supplier. Test results comparing the shrinkage, cracking, cratering and bonding of each of the above surfactants are tabulated in Table IV.

TABLE IV

| Example | Surfactant | Shrinkage | Cracking | Cratering Count | Average Area per crater |
|---|---|---|---|---|---|
| 1 | None | 17.5% | Moderate | 206 | 0.26 |
| 2 | DDBSA | 10.82% | Minor | 65 | 0.32 |
| 3 | 4-Octylbenzene Sulfonate | 12.93% | Minor | 121 | 0.41 |
| 4 | Xylene Sulfonate | 18.92% | Moderate | 115 | 0.25 |
| 5 | BIO-SOFT ® N-411 | 20.54% | Minor | 100 | 0.30 |
| 6 | BIO-TERGE ® | 9.69% | Minor | 82 | 0.53 |
| 7 | CEDEPHOS ® FA-600 | 15.24% | Minor | 104 | 0.88 |
| 8 | POLYSTEP ® A-16 | 11.75% | Minor | 106 | 0.29 |
| 9 | STEPANOL ® ME-DRY | 12.58% | Minor | 112 | 0.62 |
| 10 | NOPOCK! ® | 14.75% | Very Minor | 77 | 0.48 |

Testing of materials outside the scope of the present invention is shown in comparative examples 4, 5, 7, and 10. Increased shrinkage is obtained where the hydrocarbon substituent group has less than 12 carbon atoms as shown in Examples 4 and 10. Xylene sulfonate is a major component of NO POCK!®, and is likely to have contributed to it's poor performance (Example 10). Where the additive has a very large cationic portion, as in Example 5, and where the anionic portion is a phosphate group, as in Example 7, performance was also poor.

Examples 2, 3, 6, 8 and 9 show that superior results are obtained with the additive of the present invention. Improvement in the overall surface appearance often results in trade-offs between the specific characteristics. Improvement in cratering may be accompanied, for example, by increased shrinkage or cracking. Evaluation of test results necessarily balanced the changes in cracking, cratering and shrinkage of each test sample. Although reduced shrinkage was not the sole criterion under consideration, nor was it the ultimate goal, materials considered part of the present invention all exhibited shrinkage less than 14%. Tests exemplifying the present invention achieved the goal of enhanced surface properties by exhibiting a good combination of improved shrinkage, cracking and cratering characteristics.

While a particular embodiment of a hydrocarbon substituted sulfate, sulfonate, sulfuric acid or sulfonic acid as a joint compound additive has been shown and described, it will be appreciated by those skilled in the art that changes and modifications may be made thereto without departing from the invention in its broader aspects and as set forth in the following claims.

We claim:

1. A composition comprising:
   a joint compound comprising a binder and a filler, wherein said binder comprises latex and wherein said filler and said binder are present in a ratio of from about 100:1 to about 10:1;
   water; and,
   a surfactant additive consisting essentially of a hydrocarbon substituted sulfate, sulfonate, sulfuric acid or sulfonic acid, wherein said hydrocarbon is an aliphatic, olefinic, alicyclic or aromatic group, or combinations thereof, having from 12 to 24 carbon atoms.

2. The composition of claim 1, wherein said hydrocarbon comprises an aromatic group.

3. The composition of claim 2, wherein said hydrocarbon has from 12 to 18 carbon atoms.

4. The composition of claim 3, wherein said hydrocarbon is dodecyl benzene.

5. The composition of claim 1, wherein said surfactant additive is present in a concentration from about 0.04% to about 0.5% based on dry weight.

6. The composition of claim 1, wherein said filler is selected from the group consisting of calcium carbonate, calcium sulfate, perlite, expanded perlite, magnesium carbonate, dolomite, and combinations thereof.

7. The composition of claim 6, wherein said filler comprises expanded perlite.

8. The composition of claim 1, wherein said hydrocarbon substituted sulfate or sulfonate is in the form of a sodium or potassium salt.

9. The composition of claim 1, wherein said joint compound further comprises a cellulosic thickener.

10. The composition of claim 1, wherein said joint compound further comprises one or more preservatives.

11. The composition of claim 1, wherein said joint compound further comprises one or more suspending agents.

12. The composition of claim 1, wherein said joint compound further comprises one or more pigments.

13. The composition of claim 1, wherein said joint compound further comprises a preservative, a suspending agent, and a pigment; and said surfactant additive consists essentially of sodium dodecyl benzene sulfonate.

14. A composition comprising:

a joint compound comprising a latex binder, a filler, a preservative and a thickener, said filler comprising calcium carbonate or calcium sulfate, wherein said filler and said binder are present in a ratio of from about 100:1 to about 10:1;

water; and, a surfactant additive consisting essentially of a hydrocarbon substituted sulfonate, wherein said hydrocarbon comprises an alicyclic or an aromatic group, having from 12 to 24 carbon atoms.

15. The composition of claim 14, wherein said hydrocarbon has from 12 to 18 carbon atoms.

16. The composition of claim 14, wherein said hydrocarbon has from 16 to 20 carbon atoms.

17. The composition of claim 14, wherein said hydrocarbon comprises dodecyl benzene.

18. The composition of claim 17, wherein the concentration of said surfactant additive is from about 0.04% to about 0.5% as a percentage of all components on a dry weight basis.

19. A ready-mix joint compound obtained by the steps of:

grouping joint compound ingredients into wet components and dry components, said joint compound ingredients comprising a binder, a filler, a preservative, water and a surfactant additive, said surfactant additive comprising a hydrocarbon substituted sulfate, sulfonate, sulfuric acid or sulfonic acid, wherein said hydrocarbon is an aliphatic, olefinic, alicyclic or aromatic group, or combinations thereof, having from 12 to 24 carbon atoms, wherein said binder comprises latex, and wherein said filler and said binder are present in a ratio of from about 100:1 to about 10:1;

mixing said dry components together;

mixing said liquid components together; and mixing said dry components and said liquid components to form a homogeneous mixture.

20. The joint compound of claim 19, wherein said mixing steps occur substantially simultaneously.

* * * * *